United States Patent [19]

Elser

[11] 4,200,030
[45] Apr. 29, 1980

[54] SERVO STEERING GEAR

[75] Inventor: Dieter Elser, Essingen-Lauterburg, Fed. Rep. of Germany

[73] Assignee: Zahnradfabrik Friedrichshafen AG, Friedrichshafen, Fed. Rep. of Germany

[21] Appl. No.: 937,752

[22] Filed: Aug. 29, 1978

[30] Foreign Application Priority Data

Sep. 1, 1977 [DE] Fed. Rep. of Germany ....... 2739406

[51] Int. Cl.² ........................... F15B 9/10; F15B 13/10
[52] U.S. Cl. ............................... 91/375 A; 91/391 R; 92/110
[58] Field of Search .............. 91/375 A, 375 R, 391 R

[56] References Cited

U.S. PATENT DOCUMENTS

| | | | |
|---|---|---|---|
| 3,359,866 | 12/1967 | Folkerts | 91/375 A |
| 3,508,467 | 4/1970 | Folkerts | 91/375 A |
| 3,773,081 | 11/1973 | Venable et al. | 91/375 A |
| 3,921,669 | 11/1975 | Goff | 91/375 A |

Primary Examiner—Paul E. Maslousky
Attorney, Agent, or Firm—Zalkind & Shuster

[57] ABSTRACT

A power steering gear mechanism is disclosed having conventional elements such as a double acting cylinder in a housing, a piston with a gear rack geared to a gear sector, and threaded bore in the piston having a worm shaft, wherein a steering shaft operates a rotary valve spool with which it is integral, in rotation relative a fixed valve sleeve carried by the worm shaft and wherein a torque rod connects the worm shaft to the steering spindle and passes through the worm shaft. The novelty of the invention resides in hydraulic circuitry and in the placement of a pin carried by the worm shaft and passing through a bore in the body of the valve spool just beyond one end of the channelled flow control area, the steering shaft extending from the other end of the valve spool. The pin effects rotation of the worm shaft by engaging the side of the bore through the valve spool body during twisting of the torque rod to effect piston movement. The arrangement of the coaction of the pin with the valve spool body effects advantages such as compactness of the overall mechanism and ensures manual drive of the piston in event of breakage of the torque rod.

6 Claims, 3 Drawing Figures

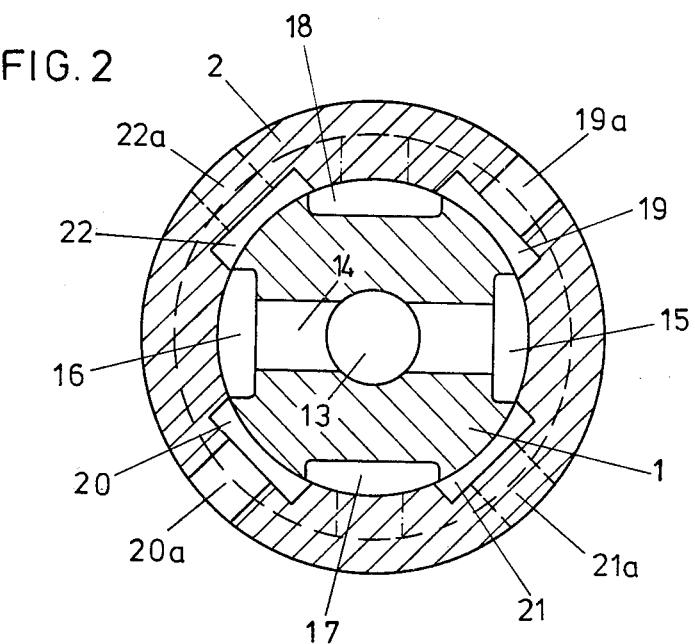
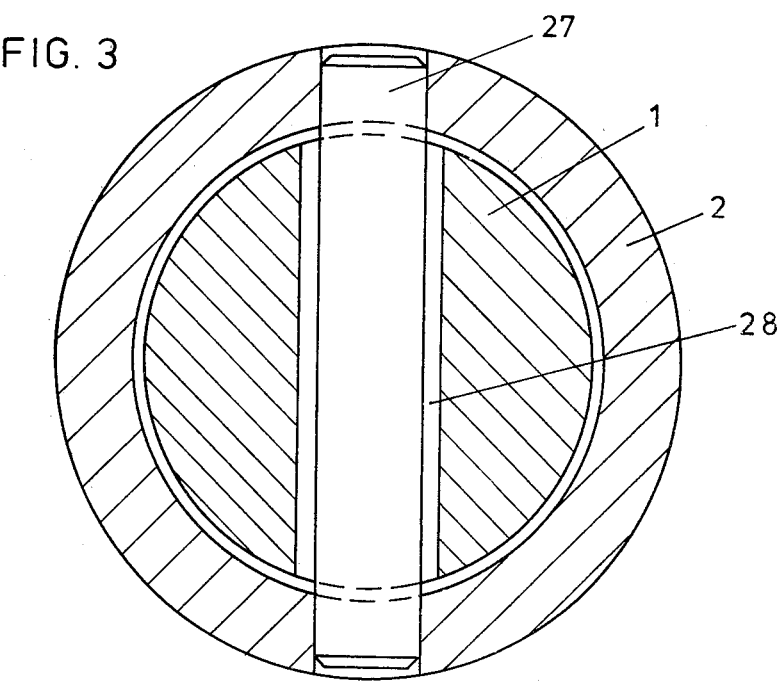

SERVO STEERING GEAR

This application is a companion to an application filed by the same inventor, Dieter Elser, on the same date, Aug. 29, 1978, Ser. No. 937,750, having the same disclosure but claiming a different portion of the construction.

The invention is for the most part of conventional construction as shown in the prior art such as U.S. Pat. Nos. 3,606,819; 3,773,081; and German OS No. 2,002,340 but improves thereon in various ways in that there is a certainty that manual steering can be accomplished through a pin disposed between the valve spool body and carried by the worm shaft to transmit torque from the steering spindle which is integral with the valve body. This pin has a certain transverse play to permit twisting of the torque rod so as to provide relative rotation up to the point where the pin engages a side of the bore of the valve spool body through which it passes. The pin, being carried specifically by the valve sleeve which is integral with the worm shaft can then transmit manual force from the steering shaft to the worm shaft and via the usual ball chain to the piston for reciprocating it in one direction or the other to effect steering.

Even in the event of breaking of the torque rod this manual force can still be transmitted, but the pin location is such relative the valve spool that a shorter housing is effected than is possible with the prior art constructions.

The compact size of the housing in the present invention contrasts with that of the prior art where a longer housing must be used because of the positioning of the operating components. Accordingly, the present invention provides an advantage where the steering gear is used for trucks with tilting cabs.

This problem of the prior art is overcome by passing the pin through the body of the valve spool itself at the end opposite the end from which the steering spindle extends and by having the pin carried in the worm shaft valve sleeve. The arrangement requires no lengthening of the housing and prevents appreciable axial change of position of the valve spool.

A break in the torque rod or attaching elements in the present construction does not bring about significant change of position of the valve spool because of the support given to the valve spool by the valve sleeve wherein the pin is supported at both ends in the valve sleeve.

A detailed description of the invention now follows in conjunction with the appended drawing in which:

FIG. 2 is a section on the line II—II of FIG. 1 to an enlarged scale, and

FIG. 3 is a section on the line III—III of FIG. 1 to an enlarged scale.

Figure 1:
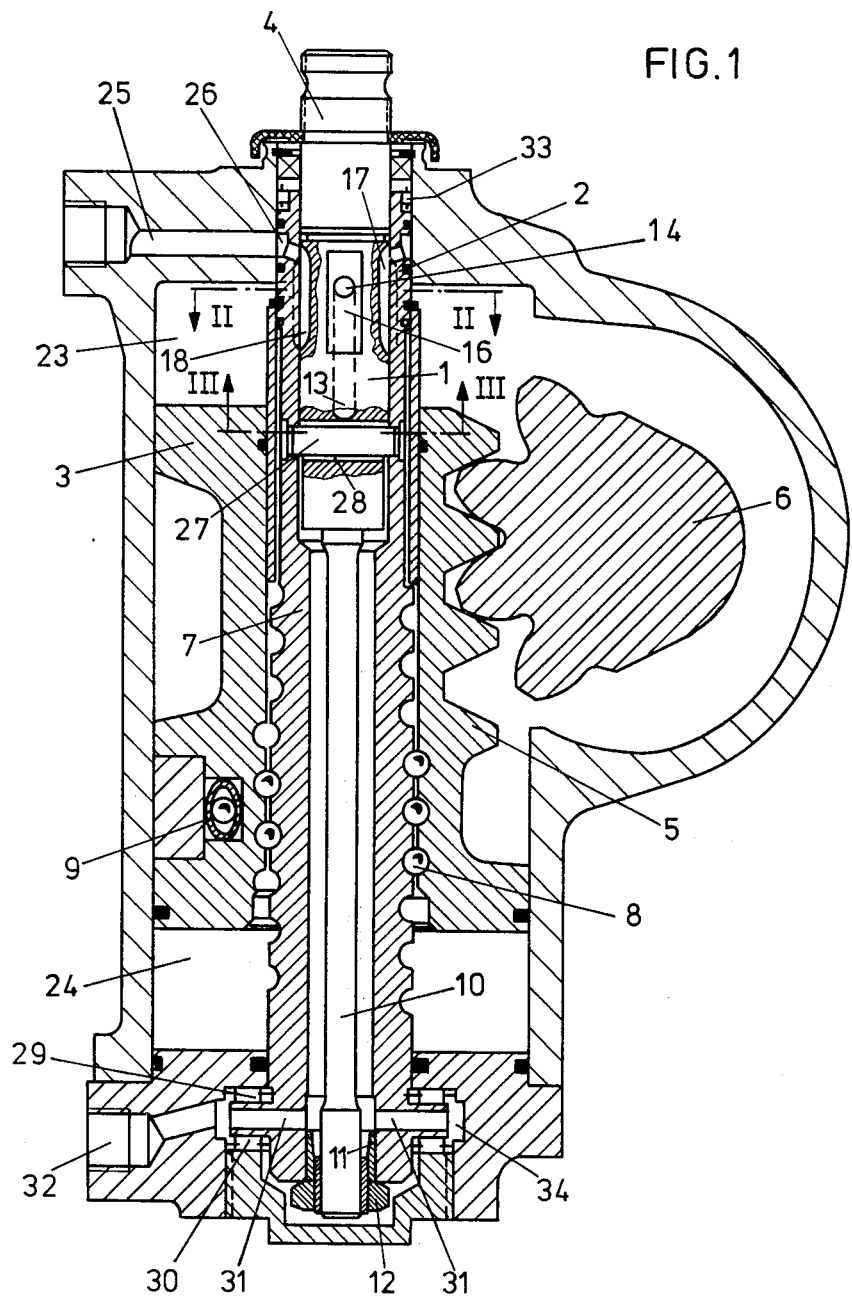
FIG. 1 shows a longitudinal section through the mechanism shown as assembled and carried by a housing.

Referring to the drawing, the essential components of the invention comprise, e.g., a valve means having a valve spool 1 which has longitudinal flow control grooves or channels and is connected with a steering spindle 4 rotative thereby within a longitudinally channelled valve sleeve 2 which is integral with the steering worm shaft 7. The housing effects a servomotor double acting cylinder to effect a steering booster arrangement wherein double acting pressure cylinder has therein the piston 3 with integral gear rack. Upon rotation of steering spindle 4 piston 3 moves axially in a conventional manner with power boost via ball chain 8 having ball return tube 9, or by manual force if pressure fails. Gear rack 5 meshes with the gear sector 6 in the housing, for rotation thereof, upon movement of piston 3 understood to actuate a mechanical steering linkage (not shown).

The worm shaft 7 has the usual threaded drive connection with the piston, comprising the ball chain 8 whereby manual rotation of the worm shaft can control or effect reciprocal motion of the piston as above mentioned, but wherein the bore in the piston through which the worm shaft passes completely is used as a flow channel, as part of the hydraulic circuit, flow occurring between the worm shaft and the bore wall. For operation of the valve spool 1, worm shaft 7 is connected at one end to a torque rod 10 which connects to the steering spindle 4, connections being at the ends of the torque rod. Thus, one end of the rod connects to the worm shaft and the other end connected with the body of valve spool 1 at one end of the valve spool opposite the end from which steering spindle 4 entends. Connection between the worm shaft 7 and the torque rod 10 is effected by a taper sleeve 11 compressed in clamping action by means of a nut 12 as shown and this arrangement serves for longitudinal adjustment of the valve spool. The valve spool connection with the torque rod is via a drive pin 27, later discussed.

Upon rotation of the steering spindle 4, worm shaft 7 will be rotated by torsional stress twisting of the torque rod 10 causing a certain amount of relative rotation between the valve spool 1 and the worm shaft 7 and valve sleeve 2 due to such twisting of the torque rod, a known effect, whereby the controlled flow for pressurizing and exhausting the power booster cylinder takes place through the channeling of the valve means and other passages intermediate the various components to effect hydraulic circuitry.

Thus, when steering spindle 4 is rotated, communication of pressure oil in the valve means (FIG. 2) occurs via grooves 15, 16 and 17, 18 of the valve spool into coacting respective grooves 19, 20 and 21, 22 of valve sleeve 2 which latter pairs of grooves connect with bores leading to the respective pressure chamber spaces 23 and 24 at the end faces of the piston 3 within the cylinder. Bores 19a and 20a lead to the pressure chamber 23 while the bores 21a and 22a lead to the pressure chamber 24 through the spacing afforded by ball chain 8, i.e., oil flow is through the annular gap between the exterior of the worm shaft 7 and the interior of the piston 3 through which the worm shaft passes, namely through the region of the ball chain 8. Oil communication is thus had to pressurize or exhaust pressure chambers 23 and 24 responsive to directional rotational movement of the steering spindle to assist steering. Thrust impact from the roadway is counteracted by the arrangement which achieves very quick response of hydraulic booster support.

Pressure inflow into the steering gear housing is effected by a housing bore 25 and annular groove 26 on the valve sleeve exterior communicating with the groove 17 and 18 of the valve spool 1 (FIG. 1).

Intermediate the valve means, specifically the spool component thereof, and the torque rod end 10, integral therewith, as shown, a pin 27 secured in valve sleeve 2 is provided through bore 28 of the valve spool body, as shown, which bore is slot shaped or oblong so that pin 27 has no longitudinal play with respect to the valve spool 1 but is allowed play transversely. Return oil is via bore 28 connecting with central bore 13 and cross bar 14 of the valve spool 1 as well as through the concentric space between torque rod 10 and worm shaft 7. However, in order to facilitate return of oil to bore 28, pin 27 may be necked down in the area of central bore 13 or central bore 13 may be countersunk or enlarged at the juncture with bore 28.

Oil is then conducted by way of a pair of cross bores 31 in a flange extending between axial bearings 29 and 30 and thence via annular groove 34 in the end cap, as shown, to return port 32. Intermediate steering spindle 4 and worm shaft 7 a suitable radial bearing 33, for example, a needle bearing is provided.

Pin 27, as will be seen is both a motion limiting and driving pin wherein it limits relative motion between the valve spool and valve sleeve when the steering shaft is rotated and then effects rotative drive of the worm shaft upon continued rotation of the steering. As seen in FIG. 1 the spacing between pin 27 and bore 28 is exaggerated for illustrative clarity.

Upon rotation of steering spindle 4 causing initially a slight rotation of valve spool 1 relative valve sleeve 2 due to twisting of torque rod 10, either cylinder chamber 23 or 24 is pressurized by the coaction of the valve means grooves effecting flow communication, depending upon direction or rotation of the steering spindle, the opposite chamber being connected for oil return as will be apparent from the hydraulic circuitry. However, such rotation continues only until pin 27 engages an edge of bore 28. Thus, pin 27 is a motion limiting of stop pin for the relative rotation. Even in the event of a break of the torque rod 10 booster pressure would continue to function in the cylinder since only the automatic mechanical return of the valve spool 1 normally provided by the torque rod 10 would not be functioning.

Should the hydraulic pressure source fail, manual force on the steering spindle would then be transmitted through pin 27 to rotate worm shaft 7 in order to reciprocate piston 3 for rotation of gear sector 6 to effect vehicle steering. Thus, pin 27 is also driving pin for transmission of manual force to reciprocate piston 3 to steer the vehicle if need be.

I claim:

1. In a power steering gear having a housing which comprises a double acting power cylinder having pressure chambers and a piston therebetween carrying a gear rack and a gear sector in said housing meshing with said gear rack and including a rotary steering spindle and a valve spool rotative therewith and also including a torque rod and hollow worm shaft wherein said torque rod extends through said worm shaft and connects said worm shaft with said steering spindle, and still further including a valve sleeve rotative with said worm shaft wherein said valve spool and valve sleeve, upon relative rotation therebetween, effected by twisting of said torque rod, have coacting flow control grooves operational to control flow to and from said pressure chambers;

and wherein a pin drivingly connects said worm shaft with said steering spindle with play in a transverse plane for twisting of said torque rod to effect relative rotation between said valve spool and said valve sleeve for flow control operation upon rotation of said steering spindle;

the improvement which comprises said valve spool having a body secured at one end to said steering spindle and being secured at the other end to said torque rod and said pin passing through said body at said other end of said valve spool and said pin being carried by said worm shaft.

2. In a power steering gear as set forth in claim 1, wherein the worm shaft and the valve sleeve are a single integral piece.

3. In a power steering gear as set forth in claim 1 or 2, including hydraulic circuitry within said housing;

the valve spool body being provided with a transverse bore through which the pin passes and which bore forms a portion of said hydraulic circuitry for pressure control of the piston.

4. In a power steering gear as set forth in claim 3, said hydraulic circuitry comprising a longitudinal bore axially in the valve spool connecting with said transverse bore and further comprising spacing between the torque rod and worm shaft connecting with said longitudinal bore.

5. In a power steering gear as set forth in claim 3, wherein the pin is disposed in the transverse bore of the valve spool body without play in the direction of the axis of the valve spool and having transverse play in said bore.

6. In a power steering gear as set forth in claim 4, wherein the pin is disposed in the transverse bore of the valve spool body without play in the direction of the axis of the valve spool and having transverse play in said bore.

* * * * *